United States Patent
Davis et al.

(10) Patent No.: US 7,403,527 B2
(45) Date of Patent: *Jul. 22, 2008

(54) LOOKUPS BY COLLISIONLESS DIRECT TABLES AND CAMS

(75) Inventors: Gordon Taylor Davis, Chapel Hill, NC (US); Andreas Guenther Herkersdorf, Langnau a. Albis (CH); Clark Debs Jeffries, Durham, NC (US); Mark Anthony Rinaldi, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/867,963

(22) Filed: Oct. 5, 2007

(65) Prior Publication Data

US 2008/0028140 A1 Jan. 31, 2008

Related U.S. Application Data

(63) Continuation of application No. 11/462,071, filed on Aug. 3, 2006, now Pat. No. 7,349,397, which is a continuation of application No. 10/144,610, filed on May 13, 2002, now Pat. No. 7,116,664.

(51) Int. Cl.
*G06F 12/00* (2006.01)
*H04L 12/56* (2006.01)

(52) U.S. Cl. .................... 370/392; 711/108; 711/216

(58) Field of Classification Search ................ None
See application file for complete search history.

(56) References Cited

U.S. PATENT DOCUMENTS 5,251,207 A 10/1993 Abensour et al.

(Continued)

FOREIGN PATENT DOCUMENTS

GB 919980015 5/1998

OTHER PUBLICATIONS

IBM Technical Disclosure Bulletin vol. 35, No. 3, "Improved Rete Algorithm—Hashing Techniques Applied to Partial Match Memories", Aug. 1992, p. 149.

(Continued)

*Primary Examiner*—Wing F. Chan
*Assistant Examiner*—Robert C Scheibel
(74) *Attorney, Agent, or Firm*—Joscelyn G. Cockburn; Anthony M. Del Zoppo, III; Driggs, Hogg, Daugherty & Del Zoppo Co., LPA

(57) ABSTRACT

A structure and technique for preventing collisions using a hash table in conjunction with a CAM to identify and prevent collision of binary keys. A portion of the hash value of a binary key, which does not collide with a portion of the hash value of any other reference binary key, is used as an entry in the hash table. If two or more binary keys have identical values of the portions of the hash values, each of these binary keys are stored in their entirety, in the CAM. The key in the CAM provides a pointer to a data structure where the action associated with that binary key is stored. If the binary key is not found in the CAM, the binary key is hashed, and a specific entry in the hash table is selected using a portion of this hash value.

10 Claims, 2 Drawing Sheets

U.S. PATENT DOCUMENTS

| | | | |
|---|---|---|---|
| 5,390,173 | A | 2/1995 | Spinney et al. |
| 5,414,704 | A * | 5/1995 | Spinney ............... 370/389 |
| 5,881,311 | A | 3/1999 | Woods |
| 5,893,086 | A | 4/1999 | Schmuck et al. |
| 5,909,686 | A | 6/1999 | Muller et al. |
| 6,104,715 | A | 8/2000 | Basso et al. |
| 6,430,190 | B1 | 8/2002 | Essbaum et al. |
| 6,735,670 | B1 * | 5/2004 | Bronstein et al. ........... 711/108 |
| 6,934,796 | B1 | 8/2005 | Pereira et al. |
| 7,039,764 | B1 * | 5/2006 | Shetty et al. ............. 711/133 |

OTHER PUBLICATIONS

IBM Technical Disclosure Bulletin vol. 38, No. 2, "Method for Organizing a Hash Table", Feb. 1995, pp. 5-8.

IBM Technical Disclosure Bulletin vol. 38, No. 8, "Mapping of Distributed Computing Environment Identities to MVS Userids", Aug. 1995, pp. 213-214.

Applied Optics vol. 24, No. 20, "Shadow Casting for Direct Table Look-Up and Multiple-Valued Logic", Oct. 15, 1985, pp. 3312-3314.

* cited by examiner

LOOKUPS BY COLLISIONLESS DIRECT TABLES AND CAMS

RELATED APPLICATION

This application is a continuation of application Ser. No. 11/462,071, filed Aug. 3, 2006, U.S. Pat No. 7,349,397, which is a continuation of application Ser. No. 10/144,610, filed May 13, 2002, now U.S. Pat. No. 7,116,664 B2.

This application is related to commonly owned application Ser. No. 09/210,222, filed Dec. 19, 1998, now U.S. Pat. No. 6,785,278, for "Hash Function for IP, MAC, and Other Structured Addresses".

FIELD OF THE INVENTION

This invention relates to a method and structure for preventing collisions between two or more stored hash values of binary keys to action items in a network environment.

BACKGROUND OF THE INVENTION

In certain networks, specific fields within message headers are used as binary keys to search data structures for specific details regarding actions necessary for appropriate processing of those messages. The length of a binary key is dependent on the size of the field(s) used to create the key. A few example key lengths may include 32 bits for an IP address, 48 bits for an Ethernet MAC address, or 104 bits for a TCP/IP 5-tuple. It is impractical to use these keys in their full form to directly address corresponding entries due to the length of the keys. This can theoretically be done in content addressable memory (CAM), but typically creates practical disadvantages because of the cost of a CAM of such size. Hence, a common approach is to hash the value of the binary key and use a preselected first portion of the hashed value to address a specific entry in a hash table. Hashing can be accomplished by creating a new value of the binary key having the same number of bits, which are unique to any given binary key, and then using only a portion of the bits, e.g. the first N bits to select the corresponding hash table entry. This value is then used to address a specific entry in a hash table, sometimes referred to as a direct table DT. Either the entire hashed value or the remaining portion of the hashed value is stored in a data structure, together with the corresponding function-specific data denoted by the binary key. Whenever a binary key is extracted from received messages, its value is hashed and the first portion of the hash value is used to access an entry in the hash table. If a valid hash table entry is found, that location in the hash table points to a data structure containing a complementary portion of a reference hash value that is compared with the equivalent complementary portion of the hash value generated from the message key to confirm the validity of the key and declare the associated action if the key is, in fact, valid. This works well for some numbers; however, in some cases, the first portion of the hashed value of one binary reference key is the same as the first portion of the hashed value of another binary reference key. This occurs because only a portion of the newly created value of the binary key is used to select an entry in the hash table and, hence, this portion of the new value of one binary key may be the same as that of another binary key. This is often referred to as a "collision". In the past, this has been dealt with by the use of patricia tree structures or the like. But this is cumbersome and relatively slow. Hence, a faster relatively inexpensive technique is needed.

SUMMARY OF THE INVENTION

The present invention provides a structure and technique for totally preventing collisions by using a hash table or direct table DT in conjunction with a content addressable memory (CAM) to identify and prevent any collisions of selected first portions of hash values, i.e., identified first portions of different binary keys. In operation, a selected portion of the hash value of any reference binary key that does not collide with an identified selected portion of the hash value of any other reference binary key is used to select an entry in the direct table. Each location addressed by the selected portion of a hash value holds a pointer to a data structure where the action represented by the binary key corresponding to that hashed value and the remaining portion of the hash value, or the entire hash value, are stored. However, if it is determined that two or more binary keys have identical values of the selected first portions of the hash values, each of these binary keys, or an identification specific to the key are stored, in their entirety, in the CAM, with the entry number of the matching CAM entry providing a pointer to a data structure where the action associated with that binary key is stored. Such binary keys, which are different but have the same value of the selected portion of their hash values, are not associated with entries stored in the hash table.

In operation, when a binary key is presented for search, the CAM is first searched to see if the binary key is stored in the CAM. If it is, the location in the CAM at which it is stored is mapped into an address pointer to the data structure containing details regarding the action to be performed. If the binary key is not found in the CAM, which indicates that there are no collisions, the binary key is hashed, and a specific entry in the hash table is selected by using the first portion of this hash value as an offset into the hash table. If the selected first portion of the hash value accesses a valid entry in the hash table, that entry contains a pointer to the data structure containing details regarding appropriate actions for processing the associated message. Either the remainder of the hashed value, or the entire hashed value, is also stored in this data structure, so it can be compared with the hashed key constructed from the message during the process of accessing the data structure. If the remainder or total hashed key stored in the data structure matches the hashed key used for the search, the search process has identified the desired match, and the associated action defined by data in the structure is indicated. If the remainder of the hash value does not compare, or if the selected portion of the hash value selects an invalid entry in the hash table, a no-match indication is given, and the associated software performs appropriate default actions. In any event, potential collisions have been avoided, by using conventional data tables for storing selected portions of the hash values of binary keys where there is no collision, and in those few cases where there would be a collision, based on selected portions of hash values; these are anticipated and avoided by storing the binary keys in a CAM with pointers to the associated actions.

DESCRIPTION OF THE PREFERRED EMBODIMENT

Figure 1:
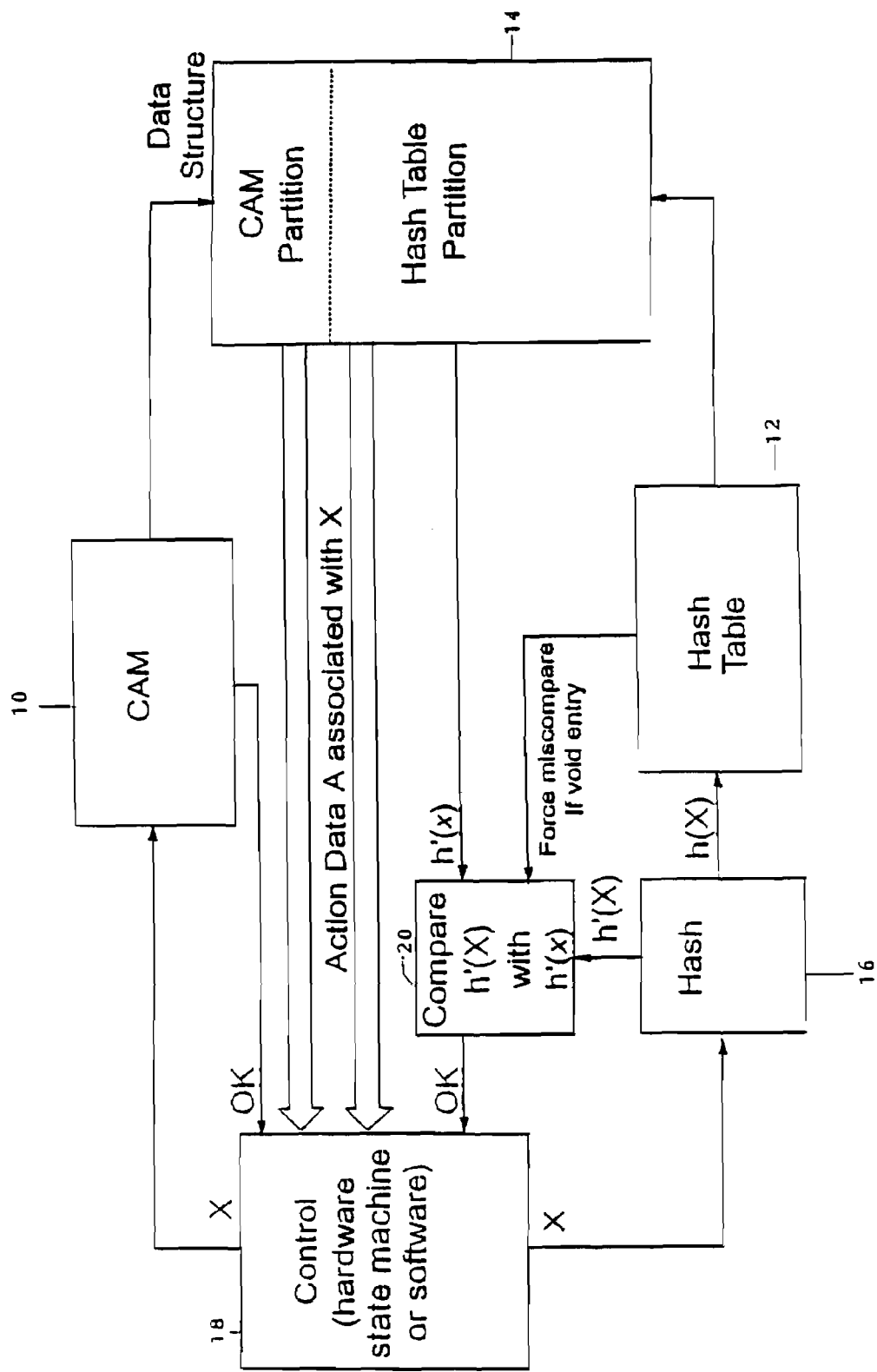
FIG. 1 is a diagram of the structure of this invention.

FIG. 1 is a high level view of the configuration of the present invention. A combination of a content addressable memory (CAM) 10 and a hash table or direct table DT 12 is shown. A data structure 14 is also shown having a cam portion and hash table portion. Hardware 16 is provided which will perform a hashing function of a binary key. An alternate embodiment of the invention includes software for implementing these hash functions. In either case, software is typically used to implement a reverse hashing required by Insert procedures to construct a binary key from the selected portions of the hashed value. A control function (either hardware or software) 18 is provided to control the operation of the CAM 10 and hashing function 16 responsive to a compare function 20. The underlying premise of the invention is that CAMS 10 are relatively expensive but do function well to provide a positive indication of a match of a binary bit number being delivered thereto. On the other hand, direct tables or hash tables DT 12 are relatively inexpensive and can provide maximum storage of entries corresponding to selected segments of hashed values at a minimum cost. However, when a binary number is hashed and a selected portion of the hashed value is used to identify the entire hashed value and, hence, the binary key value, there is a possibility that two different binary keys or binary numbers will have the same value of the selected portion of the hashed value. Briefly, hashing, as used herein, refers to generating a number of bits in a selected manner from the bits of a given binary number, such as a binary key, and then using a certain predetermined portion of the number of those bits to identify the binary key value, e.g., a typical binary key may have 32, 48, 104 bits or more, and the first N bits are used to select an entry from the hash table, where N may be limited in practical implementations to 20 or less. A technique for providing a hash function and reverse hash function is shown in commonly owned application Ser. No. 09/210,222, filed Dec. 10, 1998, now U.S. Pat. No. 6,785,278, which is incorporated herein by reference.

In hashing, it should be understood that for any given binary key, X, there is a hash function for generating a hashed key, H(X), having the same number of bits, x, as in the original binary key, X. H(X) may be partitioned into two segments, h(X) and h'(X), with h(X) having a fixed number of bits N in a specific place so that the number of bits in h(X) is greater than zero (0) and less than the total number of bits in the key X. The segment h'(X) is the complementary function of h(X), so that h'(X) has x–N bits. Thus, h(X) concatenated with h'(X) reconstructs the hashed key H(X). Moreover, knowing both the hash function h(X) and the complement h'(X) allows the value X of the binary key to be recalculated precisely.

Thus, it is possible to have two selected first portion values which are identical but which refer to different binary keys. Such a condition is known as a collision, and collisions need to be avoided so that, when a key is presented for search, there will be an unambiguous pointing to the proper action represented by a given key that is unique to the given key. However, the predetermined portion of hashed value could be the same for two or more binary keys. This results in a collision that must be avoided in order to prevent ambiguity in an action associated with the binary key.

In many network systems, different binary keys are typically contained in the header of a message that is being distributed within the system, and are used to guide actions taken on these messages by networking devices. Each binary key corresponds to attributes or details of actions to be taken in processing a message containing the key. For example, an IP destination address may be used as a key to access data structures identifying the next hop address, target port to be used for transmitting the data, transmit vs. discard indication, etc. When this particular key is presented within the system for search and execution, the key will be used to locate details of actions to be taken, and the system will take those actions based upon the particular action data associated with the binary key. Thus, whenever a particular key is presented, this must be recognized as a unique binary key and a pointer declares the action indicated by the key.

According to the present invention, a CAM 10 is used in conjunction with a hash table 12, a data structure 14, and hardware 16 to perform a hashing and unhashing function to effectively utilize the capability of the CAM while minimizing its size and, thus, its cost and using the hashed value in a hash table when the CAM is not needed.

According to the present invention, a hash function accepts a binary key, X, consisting of M bits, and computes a corresponding hashed key, H(X), that also consists of M bits. A selected first portion, h(X), of hashed key, H(X), is used to map to a corresponding entry in a hash table. The selected first portion, h(X), consists of N bits (where N<M). Likewise, the hash table uses an N=bit address to select one of $2^N$ entries. The output of a search is uniquely determined by the full M bits of X or H(X). However, the first N bits (i.e. h(X)) might not correlate to a single unique entry. A complementary function, h'(X), consisting of M–N bits, is, therefore, defined as the remainder from H(X), after h(X) has been segmented from it. This complementary function is used to validate the uniqueness of an entry in the hash table via comparison with a stored equivalent, h'(x). The invention operates as follows. If the selected portion h(X) of the hashed value of two or more binary keys is the same value, then each of these binary keys, or a value unique to each key, is stored in the CAM 10, with the location of each CAM entry associated with the address of a corresponding data structure containing appropriate data to guide message processing actions. The location of the data structure can be an offset value based on the location of the matching CAM entry, or the data structure itself could be contained within the CAM 10, or any other technique could be used to recognize and initiate action. (The technique for insertion and deletion of values into the CAM will be described presently.) If, however, the selected first portion h(X) of the hash value of any binary key is unique and the binary key is not stored in the CAM 10, then the selected portion of the hash value h(X) is used to access a specific entry in the hash or direct table DT 12 at a particular location, with a pointer from that location to the data structure having a corresponding action of the binary key having that hashed value. The remainder h'(X), or the hash value H(X), is also included in the data structure. If the remainder or all of the hash value stored in the data structure matches the hashed key used to locate the data structure, then the action is declared. Thus, in operation, when a binary key is presented, a comparison is first made in the CAM 10 to see if the binary key is stored. It will be remembered that the only binary key numbers stored in the CAM in their entirety (i.e., in their unhashed value) are those binary keys which have selected first portions of their hash values that are identical to the selected first portion of some other binary key. Thus, there are a minimum number of binary keys that need to be stored in the CAM 10. If the value corresponding to the binary key is found in the CAM 10, then a pointer from that entry points to the data structure where action to be taken is declared, or the location stores the required action. If, however, the binary key is not found in the CAM 10, then the binary key is hashed and the selected portion h(X) of the hash value is used to access the hash table or direct table DT 12. If a valid entry is found, that means that there are no other identical selected first portions of the hash values, and so a pointer from that value in the hash table or direct table DT 12 points to the data structure containing the remainder of the hash value and the action of the binary key.

In a preferred embodiment, once a binary key is placed into the CAM (due to a collision in the hash table), it will remain in the CAM even if the other colliding entries are eventually deleted via administrative table maintenance. A table maintenance task can manage these situations by periodically hashing each binary key in the CAM, and searching for entries that are unique in the selected first portion h(x). Any CAM entries identified to have a unique selected first portion h(X) can then be added to the hash table and removed from the CAM. Those skilled in the art will recognize that more complex implementations are possible that would maintain a separate data structure or an additional segment of the base data structure to identify which CAM entries have matching selected first portions h(x). Such additional data structures can enable the delete process to test an entry being deleted from the CAM to determine if the deletion would result in a remaining CAM entry that no longer matched other entries in the selected first portion h(x), thus enabling that remaining CAM entry to be moved from the CAM into the hash table.

Figure 2:
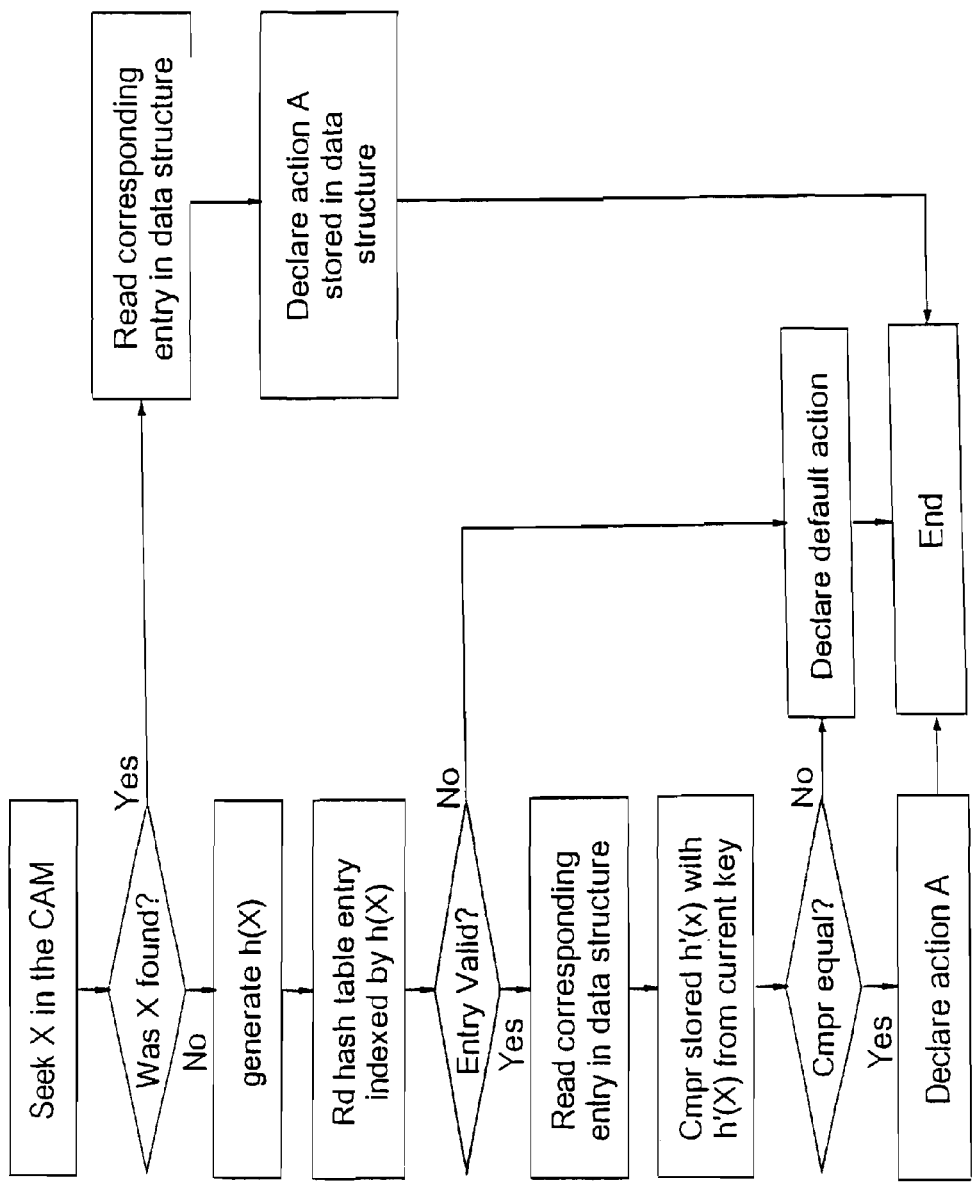
FIG. 2 is a flow diagram of one search protocol according to this invention.

Thus, the search policy can be characterized as follows where a key X is presented for search:

The following designations are used in the description of the Search policy, Insertion policy, and Deletion policy:

X, Y . . . =Binary Keys consisting of M bits
H(X), H(Y)=Hash Value of Key consisting of M bits
h(X), h(Y)=Selected Portion of Hash Value consisting of N bits
h'(X), h'(Y)=Remainder of Hash Value consisting of (M−N) bits
h(x), h(y)=Selected Portion of comparison Hash Value optionally stored in data structure consisting of N bits
h'(x), h'(y)=Remainder or Complement of comparison Hash Value stored in data structure consisting of (M−N) bits
A, B . . . =Action denoted by X, Y Search Policy (FIG. 2)
1. Seek X in the CAM 10
2. If X is found, then declare corresponding action A, and end.
3. Else generate h(X) and go to corresponding hash table 12 entry.
4. If h(X) corresponds to an invalid or empty entry, declare default action DA, and end.
5. If hash table entry is valid (a hit), compare remainder h'(X) derived from search key X with h'(x) stored in data structure.
7. If match, then declare (unambiguous and final) corresponding action A from data structure, and end.
8. Else, if no match of h'(X), then declare default action, and end.

In another embodiment, both the hash table 12 and CAM 10 are searched simultaneously. In yet another embodiment, the hash table 12 is searched first rather than the CAM 10.

For insertion of an entry corresponding to a binary key number in the CAM 10 or in the hash table or direct table DT 12, the following steps are performed. A binary key X and action A are presented for insertion. First, the M-bit binary key X is sought in the CAM 10, and if X is found, then the system will write A over the existing action and end the procedure. If X is not found, then X is hashed and the entry in hash table or direct table DT 12 is accessed using an N bit address corresponding to h(X) to see if a valid entry is found there. If the hash table entry is invalid, then the h(X) is used to store a pointer to a data structure containing action A corresponding to X and h'(x), and the program is ended. If an entry exists at index h(X), and contains a pointer from this entry to an obsolete version of action A corresponding to X (i.e. h'(X)=h'(x)), then action data A is updated in the corresponding data structure. However, if an entry exists at index h(X) and contains a pointer from this entry to an action B corresponding to Y (i.e. h(X)=h(y) but h'(X)~=h'(y)), then the binary key X is entered into the CAM 10, with the entry index corresponding to the location of a new data structure containing action A. Following this, binary key Y is recreated from the hash h(y), or equivalently h(X), and the complement h'(y) is stored in the data structure pointed to by the hash table entry indexed by h(X), and then binary key Y is entered into the CAM 10 with the entry index corresponding to the location of a new data structure containing action B. The entry corresponding to h(Y) is deleted in the hash table 12 (i.e. marked invalid), the original data structure containing action B is deleted (since this data is moved to a location corresponding to the CAM entry index for Y), and the program is ended.

An alternate implementation includes the step of copying the pointer from the hash table entry to a small data portion of the new CAM entry. In this alternative, the data structure does not have to be moved, since the new pointer continues to point to the same data structure location. The Insertion Policy can be characterized as follows where a key X and action A are presented for insertion.

Insertion Policy
1. Seek X in the CAM 10.
2. If X is found, then write A over the existing action in the corresponding data structure, and end.
3. Else compute h(X) from X, and go to hash table 12 entry indexed by h(X).
4. If DT entry is unoccupied, then create a pointer from that entry to a data structure containing index h'(x) set to a value of h'(X) and action A, and end.
5. Else (the entry at index h(X) has some existing entry stored with a pointer to a data structure) compare h'(X) with h'(y) stored in the data structure.
6. If h'(X)=h'(y), update action data A in data structure pointed to by hash table entry.
7. Else (the entry at index h(X) has some existing pointer stored to a data structure containing an action B corresponding to H(y)) enter key X in the CAM (10). Enter action A in data structure location corresponding to CAM entry index.
8. Recreate Y from H(Y)=h(Y)||h'(Y) where || denotes concatenation.
9. Enter key Y in the CAM. Enter action B in data structure location corresponding to CAM entry index.
10. Delete (i.e. mark invalid) entry at offset h(Y) from the hash table. Delete original data structure holding action B.
11. End.

For deletion, a key X is presented for deletion and the key X is sought in the CAM 10. If X is found, then delete X and corresponding data structure containing action A and mark for overwriting, and the program is done. Otherwise, if X is not found in the CAM 10, then the pre-selected N-bit portion h(X) of the hash value is used to index into the hash table (DT) 12. If the hash table slot at the h(X) index is occupied, then delete the entry and the corresponding data structure containing action A, mark the hash table entry as invalid, and end. If the entry indexed by h(X) is invalid, or if it points to a data structure containing h'(y), such that the compare at the end of the search does not match, then log a message indicating that the entry targeted for deletion was not found, and end the program. This can be written as follows when a key X is presented for deletion.

Deletion Policy
1. Seek X in the CAM 10.
2. If X is found, then delete X and corresponding data structure containing action A (mark the entry as invalid) and end.
3. Else access entry indexed by h(X) in the hash table 12.
4. If the hash table 12 entry indexed by h(X) is valid, then compare h'(X) with the value of h'(x) from the corresponding data structure.
5. If the comparison fails, the entry to be deleted is not in the table. Log "X not found for deletion" and end.
6. If the comparison matches, delete the hash table entry indexed by h(X) and delete the corresponding data structure containing action A, and end.
7. Else (invalid entry accessed from hash table) log "X not found for deletion" and end.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of preventing collisions between two or more binary keys, each key corresponding to an action to be taken, comprising:
   searching a content addressable memory for a first binary key;
   deleting the first binary key from the content addressable memory when the first binary key is found in the content addressable memory;
   searching a hash table for a selected portion of a hash value of the first binary key when the first binary key is not found in the content addressable memory;
   deleting the first binary key from the hash table when the selected portion of the hash value of the first binary key is found in the hash table;
   searching the content addressable memory for a second binary key;
   overwriting the second binary key in the content addressable memory when the second binary key is found in the content addressable memory;
   searching the hash table for a selected portion of the hash value of the second binary key when the second binary key is not found in the content addressable memory;
   writing the selected portion of the hash value of the second binary key in the hash table when the selected portion of the hash value of the second binary key is not found in the hash table;
   comparing a remainder portion of the hash value of the second binary key with a remainder portion of a hash value of a third binary key when the selected portion of the hash value of the second binary key matches a selected portion of the hash value of the third binary key in the hash table;
   overwriting an action associated with the second binary key when the remainder portion of the hash value of the second binary key matches the remainder portion of the hash value of the third binary key; and
   writing the second binary key in the content addressable memory, writing the third binary key in the content addressable memory, and deleting the third binary key from the hash table when the remainder portion of the hash value of the second binary key does not match the remainder portion of the hash value of the third binary key.

2. The method of claim 1, wherein the selected portion of the hash value of the second binary key is written with a pointer to a corresponding action and the remainder portion of the hash value of the second binary key, and further including:
   storing in the hash table the pointer to a hash table data structure using the selected portion of the hash value of the second binary key as an index into the hash table when and only when the selected portion of the hash value of the second binary key is not the same as a selected portion of a hash value of another binary key; and
   storing in the content addressable memory the second binary key and establishing an association between the content addressable memory entry location and a location in a content addressable memory data structure when and only when the selected portion of the hash value of the second binary key is the same as the selected portion of the hash value of another binary key.

3. The method of claim 2, wherein the hash table includes a plurality of entries, each indexed by a corresponding selected portion of hash value of a corresponding binary key, each entry pointing to a location in a corresponding data structure for storing a corresponding non-selected portion or entire hash value of the corresponding binary key and an associated action, and wherein the content addressable memory includes a plurality of entries, each configured to store a corresponding binary key or a value unique to a corresponding binary key and an association to an associated action.

4. A method of preventing collisions between binary keys that correspond to different actions, comprising:
   receiving a first value indicative of a first binary key;
   searching a hash table for a first sub-portion of the first value indicative of the first binary key when the first value indicative of the first binary key value is not in a content addressable memory;
   comparing a second sub-portion of the first value indicative of the first binary key with a second sub-portion of a second value indicative of a second binary key, wherein the second binary key is stored in the hash table and the second sub-portion indicative of the second binary key is stored in a hash table data structure;
   inserting the first value indicative of the first binary key in the content addressable memory when the second sub-portion of the first value indicative of the first binary key does not match the second sub-portion of the second value indicative of the second binary key;
   inserting a first action corresponding to the first binary key in a content addressable memory data structure;
   inserting a second value indicative of the second binary key in the content addressable memory when the second sub-portion of the first value indicative of the first binary key does not match the second sub-portion of the second value indicative of the second binary key; and
   inserting a second action corresponding to the second binary key in the content addressable memory data structure.

5. The method of claim 4, further comprising:
reconstructing the second value indicative of the second binary key by concatenating the second sub-portion of the second value indicative of the second binary key with a first sub-portion of the second value indicative of the second binary key.

6. The method of claim 4, further comprising:
removing the second binary key from the hash table when the second sub-portion of the first value indicative of the first binary key does not match the second sub-portion of the second value indicative of the second binary key; and
removing a third action corresponding to the second binary key from the hash table data structure.

7. The method of claim 6, further comprising:
inserting the first binary key in the hash table when the second sub-portion of the first value indicative of the first binary key matches the second sub-portion of the second value indicative of the second binary key; and
overwriting a third action, corresponding to the first binary key, that is stored in the hash table data structure with a first action corresponding to the first binary key when the second sub-portion of the first value indicative of the first binary key does not match the second sub-portion of the second value indicative of the second binary key.

8. The method of claim 7, further comprising:
overwriting a third action, corresponding to the first binary key, that is stored in the content addressable memory data structure with a first action corresponding to the first binary key when the first value indicative of the first binary key value is in the content addressable memory.

9. The method of claim 4, further comprising:
receiving a third value indicative of a third binary key;
searching the content addressable memory of the third value indicative of the third binary key;
removing the third value indicative of the third binary key from the content addressable memory when the third value indicative of the third binary key is in the content addressable memory; and
removing a third action corresponding to the third binary key from the content addressable memory data structure when the third value indicative of the third binary key is in the content addressable memory.

10. The method of claim 9, further comprising:
searching the hash table for a first sub-portion of the third value indicative of the third binary key when the third value indicative of the third binary key is not in the content addressable memory;
removing the third binary key from the hash table when the first sub-portion of the third value indicative of the third binary key is in the hash table; and
removing the third action corresponding to the third binary key from the hash table data structure when the first sub-portion of the third value indicative of the third binary key is in the hash table.

* * * * *